(12) United States Patent
Lakanen

(10) Patent No.: US 10,252,276 B2
(45) Date of Patent: Apr. 9, 2019

(54) GAS RECIRCULATION IN MINERAL FLOTATION

(71) Applicant: OUTOTEC (FINLAND) OY, Espoo (FI)

(72) Inventor: Jukka Lakanen, Espoo (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/781,488

(22) PCT Filed: Dec. 7, 2016

(86) PCT No.: PCT/FI2016/050852
§ 371 (c)(1),
(2) Date: Jun. 5, 2018

(87) PCT Pub. No.: WO2017/098081
PCT Pub. Date: Jun. 15, 2017

(65) Prior Publication Data
US 2018/0353971 A1    Dec. 13, 2018

(30) Foreign Application Priority Data
Dec. 9, 2015 (FI) .................................. 20155935

(51) Int. Cl.
*B03D 1/02* (2006.01)
*B03D 1/04* (2006.01)
*B03D 1/14* (2006.01)

(52) U.S. Cl.
CPC ............ *B03D 1/04* (2013.01); *B03D 1/028* (2013.01); *B03D 1/14* (2013.01)

(58) Field of Classification Search
USPC ........................................................ 209/168
See application file for complete search history.

(56) References Cited

U.S. PATENT DOCUMENTS

| 4,436,617 A | 3/1984 | Moore et al. |
| 5,275,732 A | 1/1994 | Wang et al. |

(Continued)

FOREIGN PATENT DOCUMENTS

| FI | 125619 B | 12/2015 |
| WO | WO-2004080599 A1 | 9/2004 |
| WO | WO-2015007955 A1 | 1/2015 |

OTHER PUBLICATIONS

Written Opinion of the International Searching Authority issued by the European Patent Office acting as the International Searching Authority in relation to International Application No. PCT/FI2016/050852 dated Mar. 17, 2017 (5 pages).

(Continued)

*Primary Examiner* — Thomas M Lithgow
(74) *Attorney, Agent, or Firm* — Robert P. Michal, Esq.; Carter, DeLuca & Farrell LLP

(57) ABSTRACT

An arrangement for recirculation of flotation gas in a mineral flotation process wherein the flotation gas volume fluctuations are handled by a closed pressure equalization loop including an apparatus for storing gas and adsorbing changes of gas pressure; a flushing line for connecting the pressure side of the primary gas recirculation loop to the apparatus for storing gas and adsorbing changes of gas pressure for allowing expulsion of a fraction of the flotation gas from the primary gas recirculation loop; and a suction line for connecting the suction side of the primary gas recirculation loop to the apparatus for storing gas and adsorbing changes of gas pressure, whereby the suction line comprises a pressure reducer for restricting flotation gas flow through the suction line.

31 Claims, 13 Drawing Sheets

(56) References Cited

U.S. PATENT DOCUMENTS 6,210,648 B1 * 4/2001 Gathje .................... B03D 1/02
423/26
2017/0197221 A1 * 7/2017 Lakanen ................. B03D 1/02

OTHER PUBLICATIONS

International Search Report issued by the European Patent Office acting as the International Searching Authority in relation to International Application No. PCT/FI2016/050852 dated Mar. 17, 2017 (3 pages).

Finnish Search Report issued by the Finnish Patent and Registration Office in relation to Finnish Application No. 20155935 dated May 30, 2016 (1 page).

* cited by examiner

GAS RECIRCULATION IN MINERAL FLOTATION

CROSS-REFERENCE TO RELATED APPLICATIONS

This application is a national phase entry under 35 U.S.C. 371 of PCT International Application No. PCT/FI2016/050852 filed Dec. 7, 2016, which claims priority to Finnish Patent Application No. 20155935, filed Dec. 9, 2015, the disclosure of each of these applications is expressly incorporated herein by reference in their entirety.

FIELD OF THE INVENTION

The present invention relates to controlling gas circulation in mineral flotation for separation of minerals from ore and concentrates, in particularly in separating molybdenum from copper containing sulfide minerals.

BACKGROUND OF THE INVENTION

WO2004080599 discloses a method for controlling the partial pressure of oxygen when mutually separating minerals in the different process steps of the separation process. In order to control the partial pressure of oxygen, the gases fed in the different process steps are recirculated in an essentially closed gas circulation created around the equipment used in the different process steps, so that the gas recirculation is controlled by measuring the potential of the slurry containing valuable minerals.

WO2015007955 discloses a method for gas handling in a mineral flotation circuit maintained under an essentially closed recirculating gas atmosphere. Pressurized process gas is fed as a flotation gas into one of more sealed flotation cells, which are maintained under an overpressure of 2-10 mbar, preferably 5-8 mbar. Process gas is collected from the tops of the flotation cells and recirculated to a blower, which pressurizes the process gas and feeds it back to the flotation cells. The pressure in the suction side of the blower is balanced with help of a level controlled gas buffer tank. The suction side of the blower this arrangement is slightly overpressurized, which elevates the risk of having leaks to ambient. Also placement of a gas buffer tank in the main recirculation loop requires the tank to be of large volume due to a large amount of gas flow to be balanced rendering it expensive and more difficult to fit into the plant layout as it takes a lot of space.

BRIEF DESCRIPTION OF THE INVENTION

An object of the present invention is thus to provide a method and an apparatus for implementing the method so as to alleviate the above disadvantages. The objects of the invention are achieved by a method and an arrangement, which are characterized by what is stated in the independent claims. The preferred embodiments of the invention are disclosed in the dependent claims.

Utilization of a closed pressure equalization loop connected to a primary gas recirculation loop allows pressure control of the flotation gas recirculation when flotation gas is circulated in a mineral flotation system by a primary gas recirculation loop comprising means for providing process gas into the primary gas recirculation loop;

a gas pressurizer, such as a recirculating compressor or a blower, for pressurising recirculating flotation gas flow;

a gas feed manifold for providing the pressurized recirculating flotation gas into flotation cell units; and a gas suction conduit for collecting flotation gas from flotation cell unit(s) and transferring it to the gas pressurizer.

Flotation gas supplied to each of the flotation cell units is accordingly collected from the gas collection space (not shown) of a mineral flotation arrangement comprising the flotation cell unit(s) by the gas suction manifold and recirculated back to the flotation cell units via the gas pressurizer.

The invention is based on the idea of allowing a fraction of the volume of the recirculating flotation gas to be withdrawn from the primary gas recirculation loop by expulsing said fraction of the volume of the recirculating flotation gas into a "closed pressure equalization loop" from the pressure side of the gas pressurizer via a "flushing line". The closed pressure equalization loop is maintained at a constant predetermined gauge pressure level with an aid of an apparatus for storing gas and adsorbing changes of pressure, in particular a gas buffer tank.

When the pressure of the closed pressure equalization loop exceeds the predetermined gauge pressure level the apparatus for storing gas and adsorbing changes of gas pressure allows recirculating flotation gas to flow into the said apparatus and the volume of gas inside the said apparatus expands maintaining the pressure at set level. When the pressure of the closed pressure equalization loop goes below the predetermined gauge pressure level the apparatus for storing gas and adsorbing changes of gas pressure allows recirculating flotation gas to flow out from the said apparatus and the volume of gas inside the said apparatus diminished maintaining the gas pressure at set level. This oscillation in gas volume inside the apparatus dampers the changes in the pressure level when so needed maintaining the gas pressure of the system at a desired level. A particular example of an apparatus for storing gas and adsorbing changes of gas pressure is a gas buffer tank.

The closed pressure equalization loop is further connected to the suction side of the gas pressurizer via a "suction line" through which the gas can flow towards suction side of the primary gas recirculation loop. The suction line comprises pressure reducing means for restricting gas flow through the suction line and optionally preventing back flow of the flotation gas. These lines allow to either expulse excessive flotation gas or import it back to the system when it so needs while maintaining the gas pressure of the system at a desired level.

Accordingly the flotation gas volume fluctuations are handled by a closed pressure equalization loop comprising an apparatus for storing gas and adsorbing changes of gas pressure, in particular a gas buffer tank;

a flushing line for connecting the pressure side of the primary gas recirculation loop to the apparatus for storing gas and adsorbing changes of gas pressure for allowing expulsion of a fraction of the flotation gas from the primary gas recirculation loop; and a suction line for connecting the suction side of the primary gas recirculation loop to the apparatus for storing gas and adsorbing changes of gas pressure either directly or via the flushing line, and for allowing flotation gas, present in the apparatus for storing gas and adsorbing changes of gas pressure and/or in the flushing line, to be withdrawn into the suction side of the primary gas recirculation loop through the suction line, whereby the suction line comprises pressure reducing means for restricting flotation gas flow through the suction line thereby maintaining and/or providing gauge vacuum to the suction side of the primary gas recirculation loop i.e. to the gas suction conduit and thus to the flotation cell unit(s).

BRIEF DESCRIPTION OF THE DRAWINGS

In the following the invention will be described in greater detail by means of preferred embodiments with reference to the attached [accompanying] drawings, in which.

DETAILED DESCRIPTION OF THE INVENTION

Figure 1:
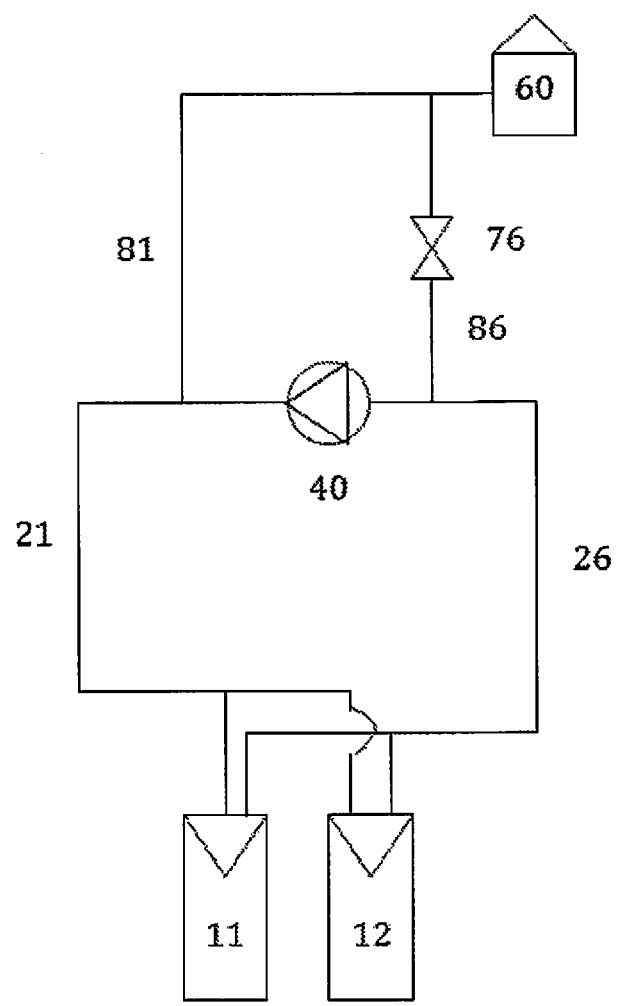
FIG. 1 illustrates a first example of the present arrangement.

Provided herein is a method for recycling flotation gas in a mineral flotation process, comprising supplying flotation gas from a primary gas recirculation loop to one or more flotation cell units 11, 12;

collecting flotation gas from the gas collection space(s) of a mineral flotation arrangement comprising the flotation cell unit(s) 11, 12 and recirculating the collected flotation gas back to the flotation cell unit(s) 11, 12 via the primary gas recirculation loop comprising a gas pressurizer 40;

allowing a fraction of the volume of the recirculating flotation gas to be bled from pressure side of the primary gas recirculation loop via a flushing line 81 to a closed pressure equalization loop comprising an apparatus for storing gas and adsorbing changes of gas pressure 60, in particular a gas buffer tank;

maintaining the pressure of the closed pressure equalization loop at a predetermined gauge pressure level by utilizing the apparatus for storing gas and adsorbing changes of gas pressure 60;

allowing flotation gas to be withdrawn from the closed pressure equalization loop into the suction side of the primary gas recirculation loop via a suction line 86 comprising pressure reducing means 76 for restricting gas flow through the suction line 86 thereby providing gauge vacuum to the said suction side of the primary gas recirculation loop and the flotation cell unit(s) 11, 12; and optionally providing process gas into the primary gas recirculation loop and/or to the closed pressure equalization loop.

The present method allows control of gas pressure of a mineral flotation process by allowing bleeding of excessive flotation gas into the closed pressure equalization loop and its import back to the flotation system when it so needs while maintaining the pressure of the system at a desired level by utilization of an apparatus for storing gas and adsorbing changes of gas pressure 60, in particular a gas buffer tank, for controlling the pressure of the closed pressure equalization loop and resultantly the pressure of the pressure side of the primary gas recirculation loop while the pressure reducing means 76 ensure that the pressure of the suction side of the primary gas recirculation loop and thus the flotation cell units are maintained at gauge vacuum i.e. at a negative pressure against ambient atmospheric pressure, preferably 0.5 to 15 mbar, more preferably 1 to 10 mbar, even more preferably 2 to 5 mbar.

Figure 2:
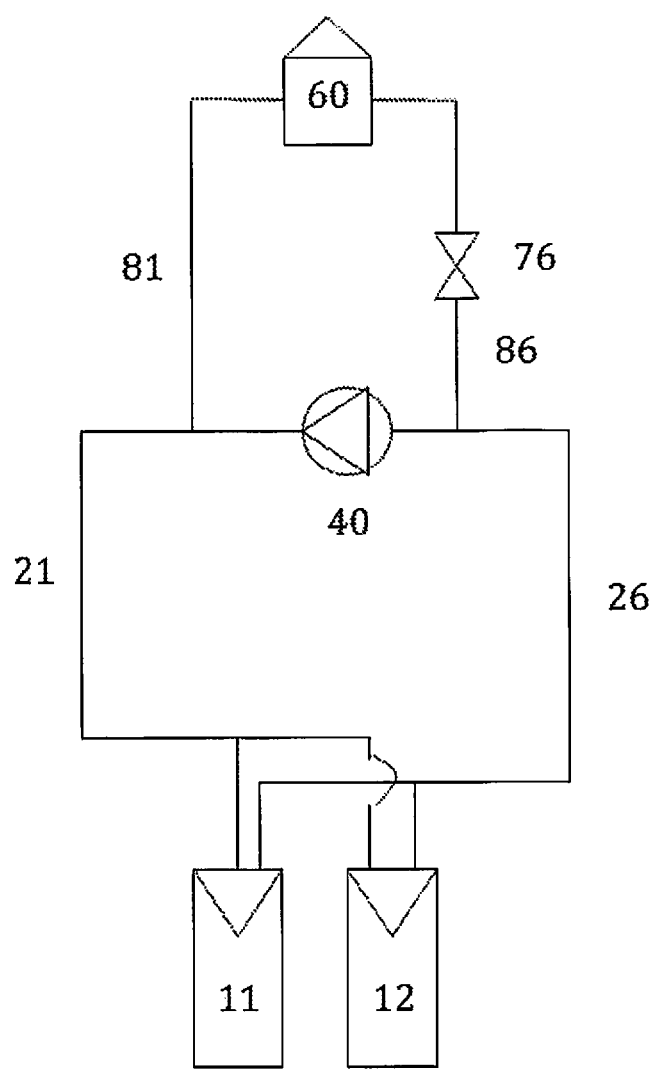
FIG. 2 illustrates a second example of the present arrangement.

FIGS. 1 and 2 show an arrangement for recirculation of flotation gas in a mineral flotation process. In FIG. 2, like components are designated by the same reference numerals as used in FIG. 1. Referring to FIG. 1 and FIG. 2, further provided herein is an arrangement for recirculation of flotation gas in a mineral flotation process, comprising a primary gas recirculation loop comprising
in the pressure side of the primary gas recirculation loop
a gas feed manifold 21 for providing recirculating flotation gas into one or more flotation cell unit(s) 11, 12,
a gas pressurizer 40 for pressurising recirculating flotation gas flow at said gas feed manifold 21,
in the suction side of the primary gas recirculation loop a gas suction manifold 26 for collecting flotation gas from the gas collection space(s) of a mineral flotation arrangement comprising of the flotation cell unit(s) 11,12 and transferring it to the gas pressurizer 40;
a closed pressure equalization loop comprising
an apparatus for storing gas and adsorbing changes of gas pressure 60, in particular a gas buffer tank,
a flushing line 81 for connecting the pressure side of the primary gas recirculation loop to the apparatus for storing gas and adsorbing changes of gas pressure 60 for allowing expulsion of a fraction of the volume of the recirculating flotation gas from the primary gas recirculation loop, and
a suction line 86 for connecting the suction side of the primary gas recirculation loop to the apparatus for storing gas and adsorbing changes of gas pressure 60, for allowing flotation gas, present in the apparatus for storing gas and adsorbing changes of gas pressure 60 and/or in the flushing line 81, to be withdrawn into the suction side of the primary gas recirculation loop through the suction line 86,
whereby the suction line 86 comprises first pressure reducing means 76 for restricting flotation gas flow through the suction line 86 thereby maintaining and/or providing gauge vacuum to the suction side of the primary gas recirculation loop.

The suction line 86 may be connected to the apparatus for storing gas and adsorbing changes of gas pressure 60, either directly (as shown in FIG. 2) or via the flushing line 81 (as shown in FIG.

The "term flotation cell unit" as used herein refers to a single individual flotation cell or to a bank, line or row of flotation cells, i.e. a serial arrangement of flotation cells where tailings from the first cell move on as the feed to the second cell and so on and the tailings from the last cell form the final tailings of the bank. The number of cells in a bank varies depending on cell size, application and plant circuit configuration. The flotation cell units 11, 12 of the present arrangement are typically sealed flotation cell units, i.e. hermetically sealed flotation cells keeping harmful byproduct gases contained.

Flotation gas is collected from the gas collection space of a mineral flotation arrangement comprising the flotation cells 11, 12 and is then recirculated back to the flotation cells through the primary gas recirculation loop.

The gas collection space of a mineral flotation arrangement comprising in particular comprises the headspace(s) of the flotation cell(s). The gas collection space typically further comprises froth collection lines that shares a common gas space with it respective flotation cell unit. The gas collection space may still further comprise the headspace of a concentrate sump where concentrate provided by the flotation process is collected via said froth collection lines. The term "headspace" refers to the space of the flotation cell unit between the surface of the liquid being foamed and the top of the foam chamber of the flotation cell unit. The headspace may vary by its diameter, height and volume.

After being collected from the gas collection space of a mineral flotation arrangement comprising of the flotation cells 11, 12 via the gas suction manifold 26 the recirculated flotation gas is pressurized by a gas pressurizer 40 such as a compressor or a blower, preferably a liquid ring compressor, before it is fed back to the flotation cells 11, 12 via the gas feed manifold 21. It is to be understood that the gas recirculation arrangement is provided with the necessary structures, such as pipelines, lids, seals, vents, blowers etc. required for ensuring recovery and recirculation of gas and its maintenance in the system as well as pressure balancing. If desired the recirculating flotation gas may be cleaned with a gas cleaning apparatus, preferably by a gas scrubber, included in any part of the gas recirculation system, preferably to the primary gas recirculation loop, to remove solid particles and/or other harmful or undesired substances, e.g. $H_2S$, from the gas before it is reintroduced into the flotation cells.

The closed pressure equalization loop comprised in the gas recirculation arrangement serves to adjust pressure of the flotation gas in the flotation system. As desired a fraction of the volume of the flotation gas is expulsed from the pressure side of the primary gas recirculation loop to the closed pressure equalization loop through the flushing line 81. Placement of the apparatus for storing gas and adsorbing changes of gas pressure 60, in particular the gas buffer tank, within a secondary gas recirculation loop i.e. the closed pressure equalization loop lowers the gas volumes that are needed to be managed by the apparatus for storing gas and adsorbing changes of gas pressure 60. Thus the required equipment is accordingly notably smaller as compared to if the apparatus for storing gas and adsorbing changes of gas pressure 60 would be arranged in the primary gas recirculation system.

The amount of the expulsed flotation gas is selected such that it exceeds the amount of process gas added after the gas pressurizer, in order to ensure that the volume of flotation gas directed to the flotation cells does not exceed the volume flow produced by the gas pressurizer. The volume of flotation gas through the closed pressure equalization loop is typically from 2 to 50 vol %, preferably from 5 to 20 vol % of the total volume of flotation gas recirculated through the primary gas recirculation loop. This ensures that the suction side of the gas pressurizer 40 is volume deficient and forces the system to complete the volume by sucking expulsed gas back in from the closed pressure equalization loop via the suction line 86 which connects the suction side of the primary gas recirculation loop to the apparatus for storing gas and adsorbing changes of gas pressure 60, in particular the gas buffer tank, which then again ensures the flotation cell gas collection spaces are under a negative pressure as set by the first pressure reducing means 76 for restricting the gas flow through the suction line.

The flushing line 81 may also comprise means for reducing the pressure of flotation gas expulsed from the pressure side of the primary gas recirculation loop to the closed pressure equalization loop to or close to the level of the pressure of the closed pressure equalization loop. This provides large pressure difference between the suction side and the pressure side of the primary gas recirculation loop. It further provides requisite pressure to the pressure side of the primary gas recirculation loop and in particular to the flotation cells 11,12 thus enabling effective foaming. Typically an over pressure of 0.3 to 1.5 bar is required in the flotation cells to allow blowing of flotation gas through a flotation cell comprising at least 2 m of floated slurry.

Figure 3:
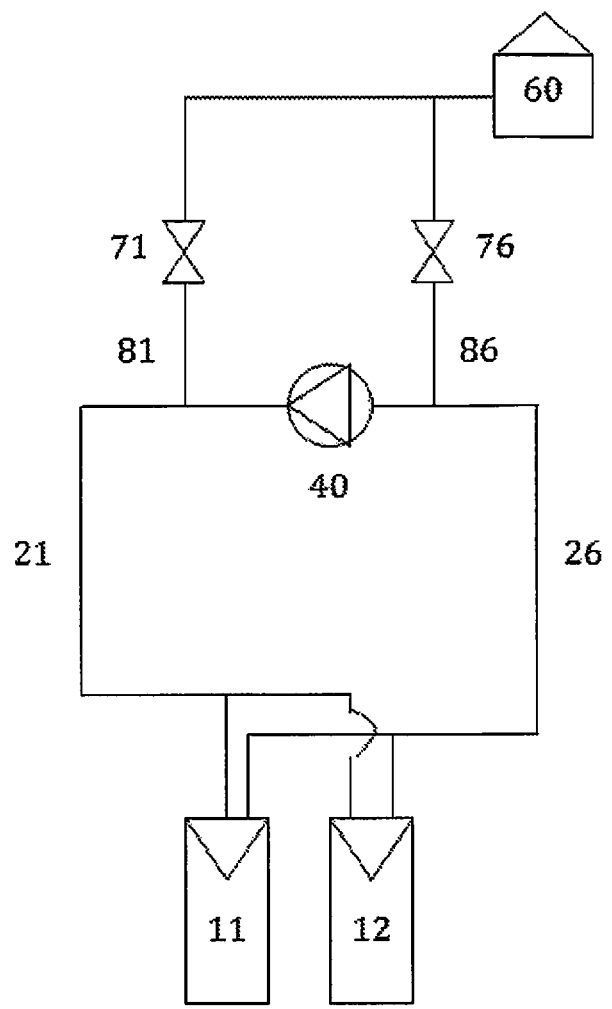
FIG. 3 illustrates a third example of the present arrangement.

FIG. 3 shows an example of an arrangement for recirculation of flotation gas in a mineral flotation process, wherein the flushing line 81 comprises a second pressure reducing means 71 for reducing the pressure of flotation gas expulsed from the pressure side of the primary gas recirculation loop to the closed pressure equalization loop to or close to the level of the pressure of the closed pressure equalization loop. In FIG. 3, like components are designated by the same reference numerals as used in FIG. 1 and/or FIG. 2.

The second pressure reducing means 71 is preferably a control valve that is operated to adjust the flow of the expulsed flotation gas. Preferably the control valve is a pressure reducing control valve.

The term "pressure reducing means" as used herein and hereafter refers to a single device or a combination of devices able act as a gas restrictor i.e. to restrict gas flow through the gas line where in is comprised, i.e. the suction line in the case of the first pressure reducing means or the flushing line 81 in the case of the second pressure reducing means, and thus to reduce the pressure of the flotation gas flowing through said gas line.

In the suction line 86 the first pressure reducing means reduces the gas pressure of the flotation gas flowing from the closed pressure equalization loop through the suction line 86 to the suction side of the primary gas recirculation loop. The suction line 86 comprising the first pressure reducing means permits control of the gas pressure and operation of the flotation cells in slight gauge vacuum. It further limits the interchange of gases between the suction side of the primary gas recirculation loop, e.g. the gas suction manifold 26 and the flotation cell unit(s) 11, 12 and the closed pressure equalization loop by the pressure difference caused by the pressure reducing means.

The first pressure reducing means may further prevent uncontrolled back flow of the flotation gas to the closed pressure equalization loop. In such case the first pressure reducing means may comprise an interlock cutting off back flow of the recirculating flotation gas to the closed pressure equalization loop from the suction side of the primary gas recirculation loop. Further, the first pressure reducing means, when preventing uncontrolled back flow of the recirculating flotation gas, ensures that unpurified flotation gas is not expulsed directly into the atmosphere when the closed pressure equalization loop is connected to atmosphere through the apparatus for storing gas and adsorbing changes of gas pressure, in particular the gas buffer tank.

With the first pressure reducing means the flotation cell unit(s) 11, 12, in particular the gas collection space of a mineral flotation arrangement comprising e.g. the headspaces, of the flotation cell unit(s) 11, 12, can be maintained under an gauge vacuum, preferably from 0.5 to 15 mbar, more preferably 1 to 10 mbar, even more preferably 2 to 5 mbar.

If comprised in the flushing line 81 the second pressure reducing means 71 reduces the gas pressure of the flotation gas flowing from the pressure side of the primary gas recirculation loop through the flushing line 81 to the closed pressure equalization loop. The flushing line 81 comprising the second pressure reducing means 71 permits operation of the pressure side of the primary recirculation loop at a pressure different from that of the closed pressure equalization loop.

The pressure reducing means may be a rigid disk or cylinder having an aperture at the central cylindrical axis. The opening size of the aperture in diameter and length is chosen to insure that the gas flow is properly restricted in reducing the pressure in the flotation cell side of the suction line. The desired pressure may be adjusted by adjusting the diameter of the aperture. As for another example the pressure reducing means may be a membrane or a packed-bed unit. The membrane type or the material of the packed-bed is chosen to insure that the gas flow is properly restricted in reducing the pressure in the flotation cell side of the suction line. As for still another example the pressure reducing means may be a pressure reducing valve. The pressure reducing valve may be adjustable for providing desired pressure either manually or automatically. Examples of suitable pressure reducing means further include, but are not limited to, choke tubes, choke pipes, choke orifice plates, flow restricting membranes, and flow restricting packed-bed units. When an interchangeable choke pipe or a flow restricting packed-bed unit is utilized, the length of the chock pipe or the flow restricting packed-bed unit, respectively, is preferably less than 3 m.

The pressure reducing means may alternatively be a control valve. The control valve is operated to adjust the flow the flotation gas allowed to be withdrawn into suction side of the primary gas recirculation loop through the suction line 86 and to prevent uncontrolled back flow of the recirculating flotation gas. The degree of partially opening the valve may be utilized to provide the desired pressure. The opening and closing of the control valve is preferably done automatically in response to control signals received from the suction side of the primary gas recirculation loop. In an event of a back flow of recirculating flotation gas for any reason, the control valve will close the flow to the closed pressure equalization loop.

The pressure reducing means, in particularly when equipped for preventing back flow of flotation gas, may be provided as a combination of devices. It then preferably comprises a gas restrictor and an interlock. The gas restrictor may be inserted and mounted permanently to the suction line 86 or it may be interchangeable. The interlock may be positioned at either side of the gas restrictor; preferably the interlock is positioned between the gas restrictor and the atmosphere. The gas restrictor may for example be a rigid disk or cylinder having an aperture at the central cylindrical axis. The opening size of the aperture in diameter and length is chosen to insure that the gas flow is properly restricted in reducing the pressure in the flotation cell side of the suction line. The desired pressure may be adjusted by adjusting the diameter of the aperture. As for another example the gas restrictor may be a membrane or a packed-bed unit. The membrane type or the material of the packed-bed is chosen to insure that the gas flow is properly restricted in reducing the pressure in the flotation cell side of the suction line. As for still another example the gas restrictor may be a pressure reducing valve. The pressure reducing valve may be adjustable for providing desired pressure either manually or automatically. Examples of suitable gas restrictors include, but are not limited to, choke tubes, choke pipes, choke orifice plates, flow restricting membranes, and flow restricting packed-bed units. When an interchangeable choke pipe or a flow restricting packed-bed unit is utilized, the length of the chock pipe or the flow restricting packed-bed unit, respectively, is preferably less than 3 m. Examples of suitable interlocks include, but are not limited to, no-return valves, check valves, and backflow barriers.

A single device example of pressure reducing means for restricting the gas flow and preventing back flow of flotation gas from the suction side of the primary gas recirculation loop to the closed pressure equalization loop is a water lock. When a water lock is utilized, the water lock depth sets a pressure limit, which then becomes the required gauge vacuum in the flotation cell gas collection space for the gas to flow from the flushing line 81 towards the flotation cells.

The term "closed" in connection to the term "closed pressure equalization loop" refers to the fact that the closed pressure equalization loop is not directly connected to atmosphere so to prevent a possibility that part of the flotation gas which is directed to the closed pressure equalization loop is lost or mixed with air which would potentially lead to introducing air/oxygen into the system. The closed pressure equalization loop may be indirectly connected to the atmosphere e.g. through a bleeding line comprising means that allow bleed of flotation gas from the loop but prevent flow of atmospheric air to the loop and thus mixing of flotation gas with air. The closed pressure equalization loop, in particular the apparatus for storing gas and adsorbing changes of gas pressure 60, in particular the gas buffer tank, comprised in the closed pressure equalization loop, is preferably hermetically sealed to ensure that air/oxygen is not introduced into the system in an uncontrolled fashion.

It is typically desirable for a gas recirculation arrangement to comprise a bleeding line for connecting the arrangement to atmosphere to allow bleed of excessive flotation gas from the system and/or for immediate lowering of system gas pressure in case of imminent emergencies. The present method and arrangement allows placement of the bleeding line to be selected to best correspond to the individual system requirements.

Figure 4:
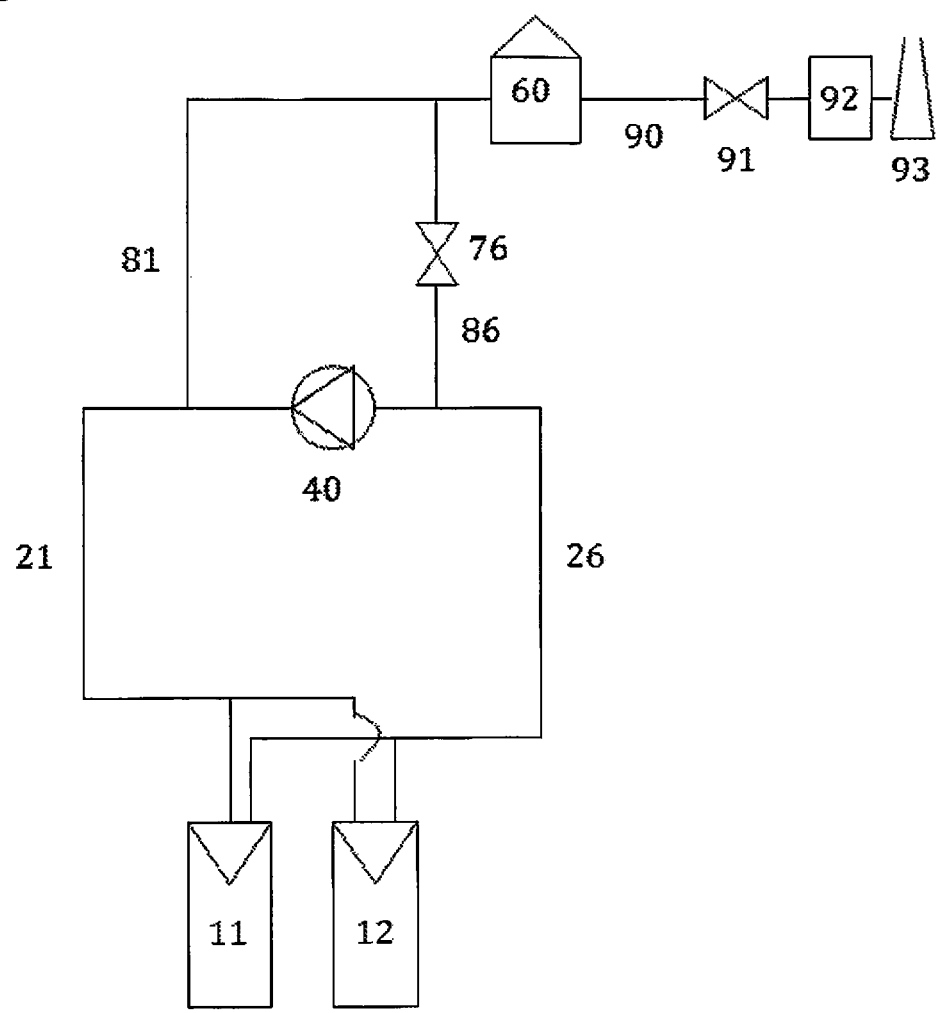
FIG. 4 illustrates a fourth example of the present arrangement.

FIG. 4 shows an example of an arrangement for recirculation of flotation gas in a mineral flotation process, wherein a bleeding line is arranged to the closed pressure equalization loop. In FIG. 4, like components are designated by the same reference numerals as used in any one or more of FIGS. 1 to 3. With reference to FIG. 4, the closed pressure equalization loop comprise a primary bleeding line 90 for bleeding recirculating flotation gas from the closed pressure equalization loop to atmosphere, when necessary.

As shown in FIG. 4 the primary bleeding line preferably connects from the apparatus for storing gas and adsorbing changes of gas pressure 60, e.g. the gas buffer tank, to the atmosphere for ensuring that the closed pressure equalization loop remains sufficiently closed from the atmosphere. As further shown in FIG. 3, the primary bleeding line 90 advantageously comprises a gas cleaning apparatus 92, preferably a gas scrubber e.g. a packed bed scrubber, for cleaning the bled gas before it is released to the atmosphere via a stack 93.

With reference to FIG. 4, the primary bleeding line 90 preferably further comprises means 91 for controlling the bleed of the flotation gas from the closed pressure equalization loop and preventing uncontrolled back flow of the bled flotation gas back to the closed pressure equalization loop. Preferably said means 91 for controlling the bleed of the flotation gas from the closed pressure equalization loop and preventing uncontrolled back flow of the bled flotation gas back to the closed pressure equalization loop is a control valve.

Figure 5:
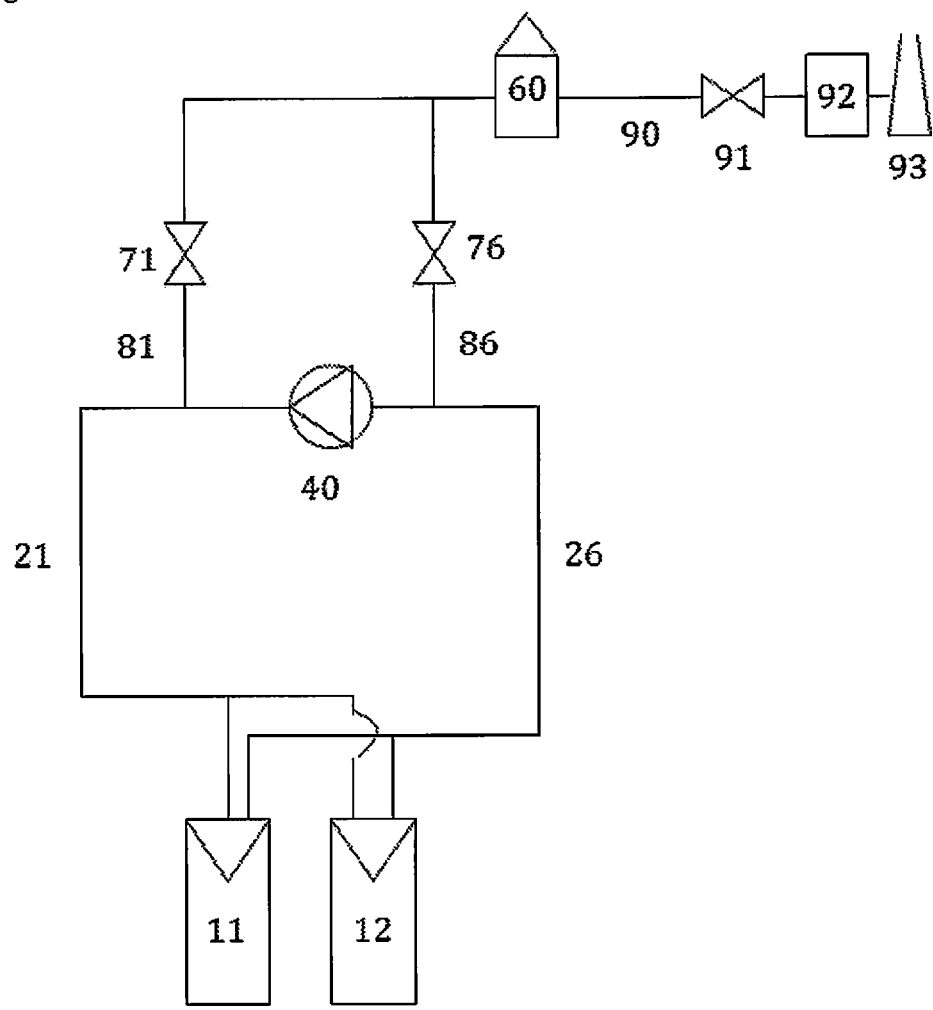
FIG. 5 illustrates a fifth example of the present arrangement.

FIG. 5 shows an example of an example of an arrangement for recirculation of flotation gas in a mineral flotation process, wherein the closed pressure equalization loop comprises a primary bleeding line 90 and the flushing line 81 comprises a pressure reducing means 71 for reducing the pressure of flotation gas expulsed from the pressure side of the primary gas recirculation loop to the closed pressure equalization loop to or close to the level of the pressure of the closed pressure equalization loop. In FIG. 5, like components are designated by the same reference numerals as used in any one or more of FIGS. 1 to 4. With reference to FIG. 5, the primary bleeding line connects from the apparatus for storing gas and adsorbing changes of gas pressure 60, e.g. the gas buffer tank, to the atmosphere for ensuring that the closed pressure equalization loop remains sufficiently closed from the atmosphere. As further shown in FIG. 5, the primary bleeding line 90 comprises a gas cleaning apparatus 92, preferably a gas scrubber e.g. a packed bed scrubber, for cleaning the bled gas before it is released to the atmosphere via a stack 93. The primary bleeding line 90 also further comprises means 91 for controlling the bleed of the flotation gas from the closed pressure equalization loop and preventing uncontrolled back flow of the bled flotation gas back to the closed pressure equalization loop. Preferably said means 91 for controlling the bleed of the flotation gas from the closed pressure equalization loop and preventing uncontrolled back flow of the bled flotation gas back to the closed pressure equalization loop is a control valve This arrangement allows operation of the pressure side of the primary gas recirculation loop and the closed pressure equalization loop at different pressure levels while bleeding of excess flotation gas may be performed from the closed pressure equalization loop. It further minimizes volume of bled flotation gas.

Figure 6:
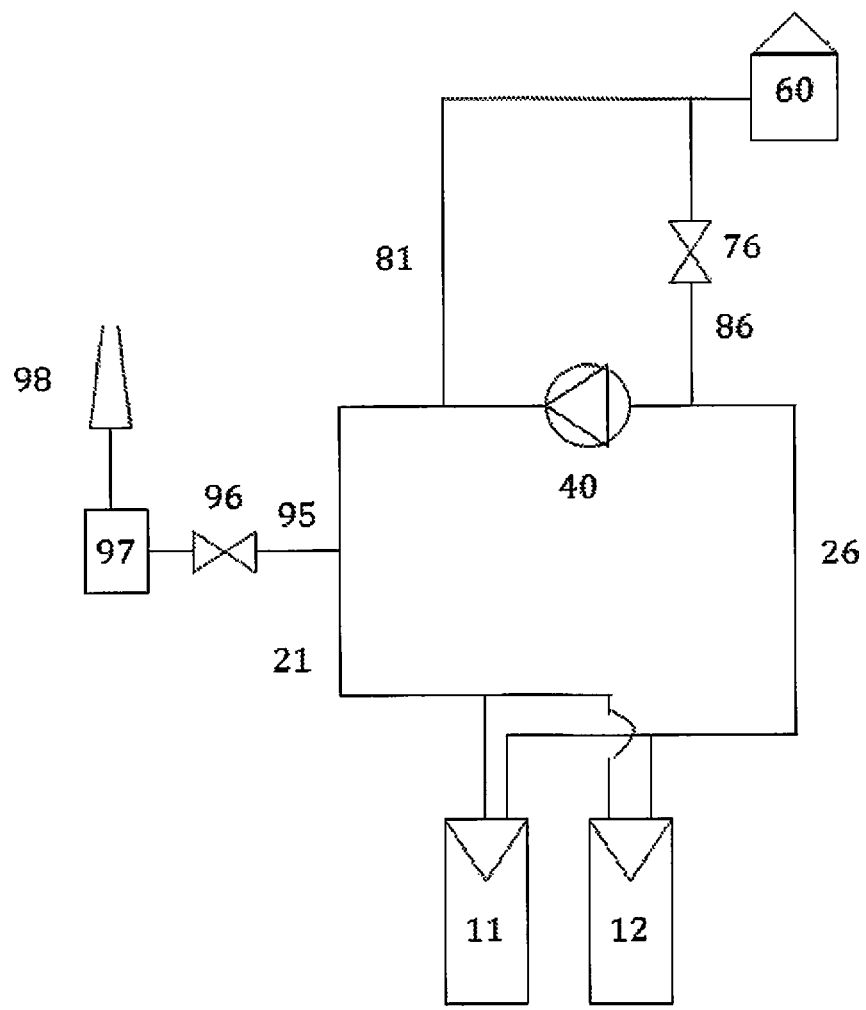
FIG. 6 illustrates a sixth example of the present arrangement.

Alternatively, as shown in FIG. 6, or additionally (not shown) the primary gas recirculation loop may comprise a secondary bleeding line 95 for bleeding recirculating flotation gas from the primary gas recirculation loop to the atmosphere when necessary. In FIG. 6, like components are designated by the same reference numerals as used in any one or more of FIGS. 1 to 5. As it is beneficial to clean the bled gas before it is released to the atmosphere the secondary bleeding line 95 advantageously comprises a gas cleaning apparatus 97, preferably a gas scrubber e.g. a packed bed scrubber, for cleaning the bled gas before it is released to the atmosphere via a stack 98. The secondary bleeding line preferably further comprises means 96 for controlling the bleed of the recirculating flotation gas from the primary recirculation loop. Preferably said means 95 for controlling the bleed of the recirculating flotation gas from the primary recirculation loop is a control valve.

The secondary bleeding line 95 connecting from the pressure side of the primary gas recirculation loop to the atmosphere allows direct calculation of gas flows in the gas recirculation system as the bled gas is driven by a large overpressure, which makes gas flow rate measurable and thus allows calculation of the volume expelled.

Figure 7:
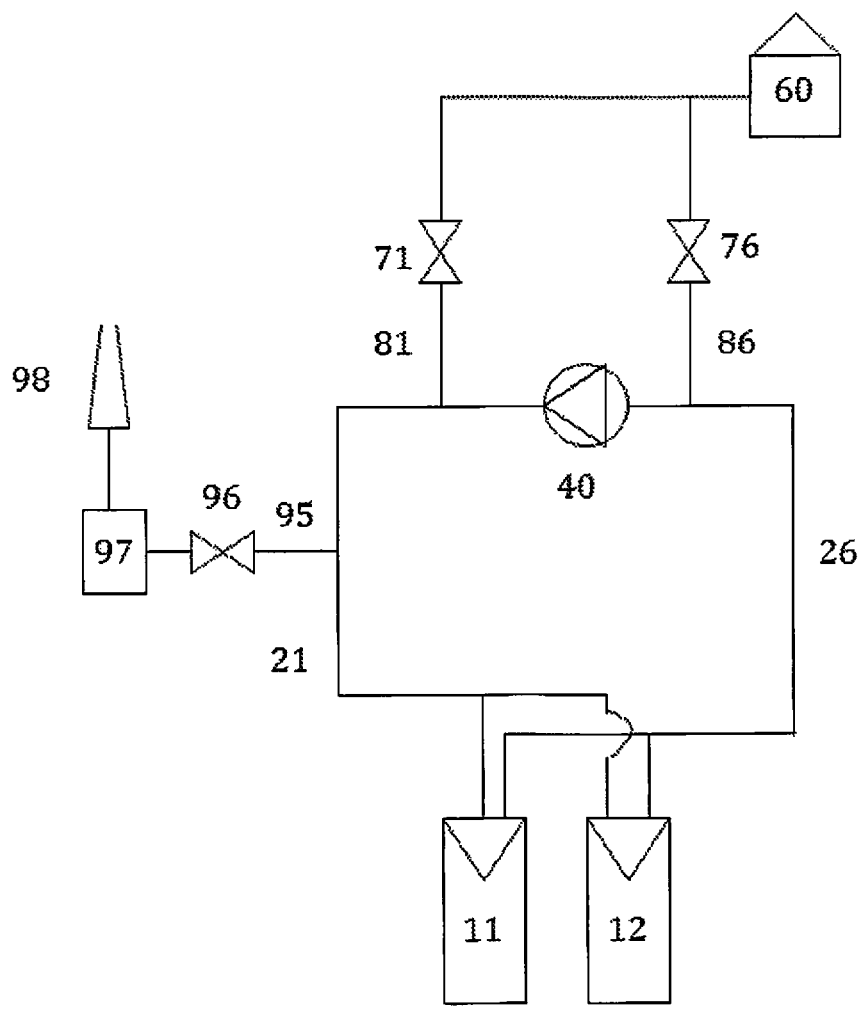
FIG. 7 illustrates a seventh example of the present arrangement.

Further alternatively, as shown in FIG. 7, the primary gas recirculation loop may comprise a secondary bleeding line 95 while the flushing line 81 comprises a pressure reducing means 71 for reducing the pressure of flotation gas expulsed from the pressure side of the primary gas recirculation loop to the closed pressure equalization loop to or close to the level of the pressure of the closed pressure equalization loop. In FIG. 7, like components are designated by the same reference numerals as used in any one or more of FIGS. 1 to 6. With reference to FIG. 6, the secondary bleeding line connects from the pressure side of the primary gas recirculation loop to the atmosphere. As further shown in FIG. 6 it is beneficial to clean the bled gas before it is released to the atmosphere and thus the secondary bleeding line 95 preferably comprises a gas cleaning apparatus 97, preferably a gas scrubber e.g. a packed bed scrubber, for cleaning the bled gas before it is released to the atmosphere via a stack 98. The secondary bleeding line 95 also further comprises means 96 for controlling the bleed of the flotation gas from the primary gas recirculation loop. Preferably said means 96 for controlling the bleed of the flotation gas from the primary gas recirculation loop is a control valve.

This arrangement allows operation of the pressure side of the primary gas recirculation loop and the closed pressure equalization loop at different pressure levels while bleeding of excess flotation gas may be performed from the primary recirculation loop. It further allows quicker bleeding and easier accurate measurement of bled flotation gas.

Figure 8:
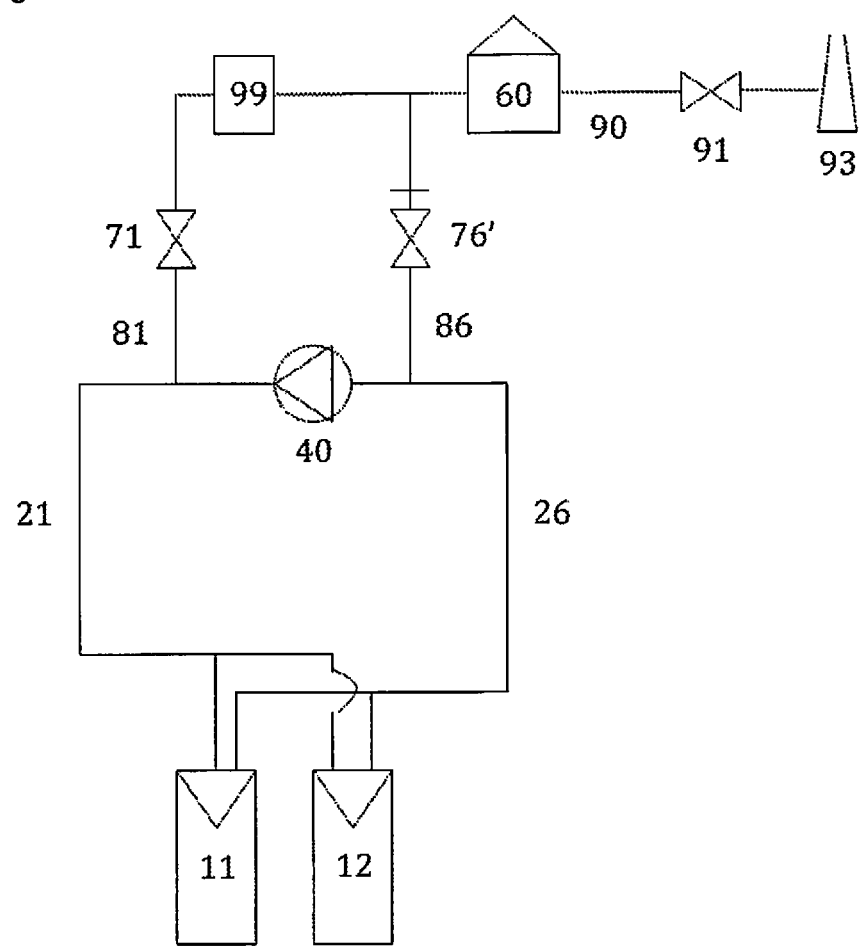
FIG. 8 illustrates an eight example of the present arrangement.

FIG. 8 shows an example of an arrangement for recirculation of flotation gas in a mineral flotation process wherein the closed pressure equalization loop comprises a primary bleeding line 90 comprising means 91 for controlling the bleed of the flotation gas from the closed pressure equalization loop and preventing uncontrolled back flow of the bled flotation gas back to the closed pressure equalization loop connecting from the apparatus for storing gas and adsorbing changes of gas pressure 60, e.g. the gas buffer tank, to the atmosphere for bleeding recirculating flotation gas from the closed pressure equalization loop to atmosphere, but the primary bleeding line 90 does not comprise means gas cleaning apparatus 92 for cleaning the bled gas before it is released to the atmosphere via a stack 93. In such case it is beneficial that the suction line 86 comprises a first pressure reducing means 76' wherein the said first pressure reducing means 76' are further equipped for preventing back flow of flotation gas from the suction side of the primary gas recirculation loop to the closed pressure equalization loop to prevent unexpected release of unpurified flotation gas from the gas recirculation system. In FIG. 8, like components are designated by the same reference numerals as used in any one or more of FIGS. 1 to 7. As it is desirable to clean the bled gas before it is released to the atmosphere via a stack 98 and as the primary bleeding line 90 shown in FIG. 8 does not comprise a gas cleaning apparatus 92, a gas cleaning apparatus 99 is comprised in the flushing line 81 for cleaning the flotation gas before it enters the primary bleeding line 90. The first pressure reducing means 76' are thus used to prevent back flow of unpurified flotation gas to the atmosphere.

As a portion of the flotation gas is let out of the primary gas recirculation loop though the flushing line 81, a corresponding volume of flotation gas needs to be replaced by supplying more gas by sucking flotation gas back towards the flotation cells 11, 12 through the suction line 86 and the first pressure reducing means 76. Suction of the flotation gas back through the first pressure reducing means 76 will cause the flotation cells 11, 12 to have a pressure lower than that of the closed secondary equalization loop and/or the ambient atmosphere in their gas collection space(s). This provides the benefit of operating the forced-air flotation cells under a set gauge vacuum gas collection space pressure. Said gauge vacuum pressure is caused by the suction of the gas pressurizer 40, to which the gas suction manifold 26 is connected. Also, while allowing a fraction of the recirculated flotation gas to exit the primary gas recirculation loop, the system is able to constantly equalize its internal volume/pressure with the reserve of flotation gas residing in the closed pressure equalization loop, due to the differential between the amount of gas which is blown out to the flushing line 81 and the amount of gas which is sucked back in through the suction line. Any excess volume that cannot be dealt with the operation of the apparatus for storing gas and adsorbing changes of gas pressure 60, comprised in the closed pressure equalization loop can be expulsed from the gas recirculation system to atmosphere, and any volume shortage will be automatically compensated by increased gas suction from the closed pressure equalization loop to the primary gas recirculation loop.

Process gas may be added to the mineral flotation process in order to control the amount of flotation gas in the system and/or the oxygen level in the flotation gas and/or the electrochemical potential of the slurry and/or to expulse flotation gas with undesired by-product gas, e.g. $H_2S$, which might be forming in the flotation cell unit(s) 11, 12. Utilization of an inert gas as the flotation gas reduces the consumption of flotation chemicals, such as NaHS, in the mineral flotation.

Process gas is added to the gas recirculation system if necessary. Process gas when required is added either to the primary gas recirculation loop or to the closed pressure equalization loop or both, as desired. Accordingly the present arrangement may comprise means for providing process gas into the primary gas recirculation loop and/or the closed pressure equalization loop. Preferably process gas is provided to the closed pressure equalization loop, in particular in close proximity of the apparatus for storing gas and adsorbing changes of gas pressure 60. Adding gas to the closed pressure equalization loop causes no fluctuations in the pressures of the pressure or suction side of the primary gas recirculation loop. The stability of pressure in said primary gas recirculation loop is desired for process handling.

Introduction of process gas through means 30 causes an increase of total flotation gas volume, which can then compensated by expulsion of flotation gas through the flushing line 81 and/or a bleeding line 86, This may be controlled as desired by operation of the pressure reducing means, e.g. a control valve, comprised in the flushing line 81 and/or the bleeding line 86, respectively.

In accordance with the present method and arrangement flotation gas is provided to the gas recirculation system initially as pressurized process gas, fed to flotation cells 11, 12, and recirculated from all of the flotation cells in the system. The flotation gas is preferably oxygen-deficient, i.e. it is either free of oxygen gas or contains a volume fraction of oxygen gas that is lower than the volume fraction of oxygen gas in ambient air. The flotation gas is preferably an inert gas that is essentially free of oxygen gas or has only very low oxygen gas content. In a preferred embodiment, the flotation gas consists essentially of inert gas or has a very high content of inert gas, for example, nitrogen, argon, helium and/or carbon dioxide, with nitrogen gas being particularly preferred as the inert gas. However, initially the flotation gas may be ambient air, which during the process is depleted of oxygen as it is consumed by reactions between the flotation reagent and the feed. The flotation gas preferably comprises at least 85 vol % of inert gas, which may be a mixture of multiple inert gas components, more preferably at least 90 vol %, even more preferably at least 95 vol %, and most preferably the flotation gas consists essentially of only inert gas. When the flotation gas includes some oxygen gas, it should be only a small amount, as noted. Preferably, the flotation gas comprises no more than 15 vol % oxygen, more preferably no more than 10 vol % oxygen, and even more preferably no more than 5 vol % oxygen.

Process gas is typically added to the gas recirculation arrangement in an amount that is required to maintain the amount of flotation gas at desirable level. The added process gas may be any of the gases discussed above in context of flotation gas, in particular inert gas such as nitrogen.

Process gas is preferably provided to the gas recirculation arrangement at the closed pressure equalization loop. When process gas is provided to the gas recirculation arrangement at the closed pressure equalization loop, it can be introduced at any suitable part of the closed pressure equalization loop, preferably to the apparatus for storing gas and adsorbing changes of gas pressure 60, e.g. the gas buffer tank, the flushing line 81 or the suction line 86. This prevents creating disturbance into the primary gas recirculation loop pressure.

Figure 9:
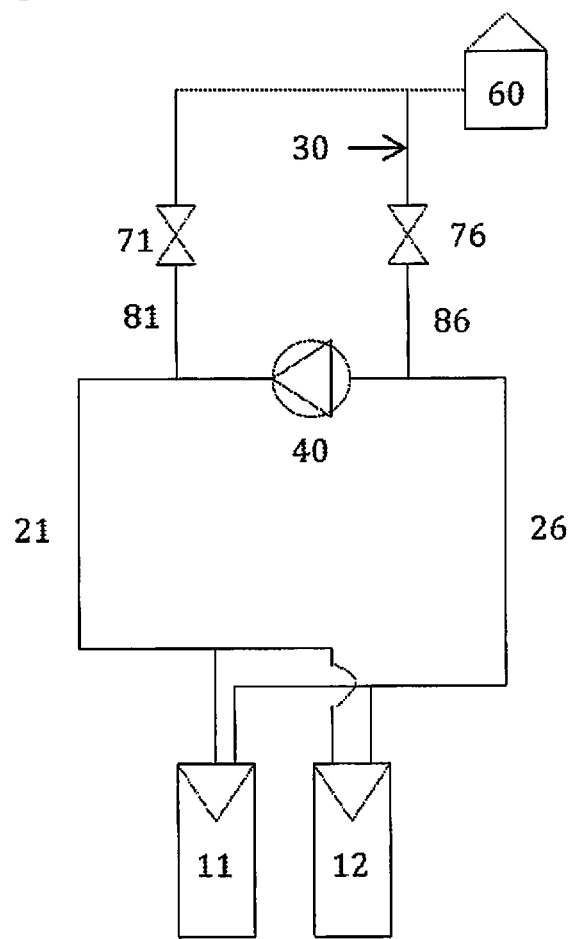
FIG. 9 illustrates a ninth example of the present arrangement.

Preferably process gas is provided to the closed pressure equalization loop, in particularly to the apparatus for storing gas and adsorbing changes of gas pressure 60, as this prevents creating disturbance into the primary gas recirculation loop gauge pressures. FIG. 9 illustrates an example of the present arrangement wherein the process gas is provided to the gas recirculation arrangement at the closed pressure equalization loop.

With reference to FIG. 9 in an example an arrangement for recirculation of flotation gas in a mineral flotation process, wherein the closed pressure equalization loop comprises means 30 for providing process gas into the closed pressure equalization loop. In FIG. 9, like components are designated by the same reference numerals as used in any one or more of FIGS. 1 to 8. As shown in FIG. 9, the means 30 for providing process gas into the closed pressure equalization loop is preferably located for providing process gas into the closed pressure equalization loop at the suction line 86, more preferably between the apparatus for storing gas and adsorbing changes of gas pressure 60, in particular the gas buffer tank, and the connection point of the suction line 86 to the primary gas recirculation loop, most preferably near the apparatus for storing gas and adsorbing changes of gas pressure 60, e.g. the gas buffer tank, in particular between the first pressure reducing means 76 and the apparatus for storing gas and adsorbing changes of gas pressure 60, e.g. the gas buffer tank. Control of the addition of the process gas is preferably controlled in relation to the level of surface of the apparatus for storing gas and adsorbing changes of gas pressure 60 and thus it is desirably to add process gas near the measuring point to allow accurate measurement.

Alternatively or additionally process gas can be provided into the gas recirculation arrangement at the primary gas recirculation loop. Process gas may be added either before or after the recirculating compressor 40. Thus when process gas is provided to the gas recirculation arrangement at the primary gas recirculation loop, it is introduced into the primary gas recirculation loop either to the suction side of the recirculating compressor or to the pressure side of the recirculating compressor 40. When a liquid ring compressor is utilized as the recirculating compressor, process gas is preferably introduced into the primary gas recirculation loop in the pressure side of the recirculating compressor.

Figure 10:
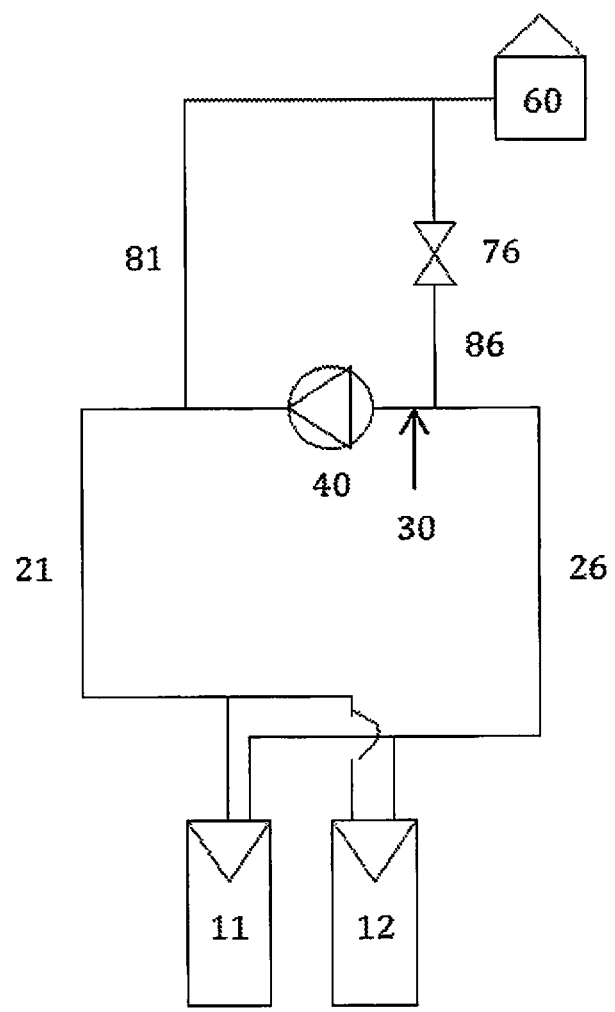
FIG. 10 illustrates a tenth example of the present arrangement.

FIG. 10 illustrates an example of the present arrangement wherein the process gas is provided to the gas recirculation arrangement at the suction side of the primary gas recirculation loop. In FIG. 10, like components are designated by the same reference numerals as used in any one or more of FIGS. 1 to 9.

With reference to FIG. 10 in an alternative example an arrangement for recirculation of flotation gas in a mineral flotation process wherein the primary gas recirculation loop comprises means 30 for providing process gas into the primary gas recirculation loop. As shown in FIG. 10, the means 30 for providing process gas into the primary gas recirculation loop is preferably located for providing process gas into the primary gas recirculation loop between the connection point of the suction line 86 and the gas pressurizer 40.

Figure 11:
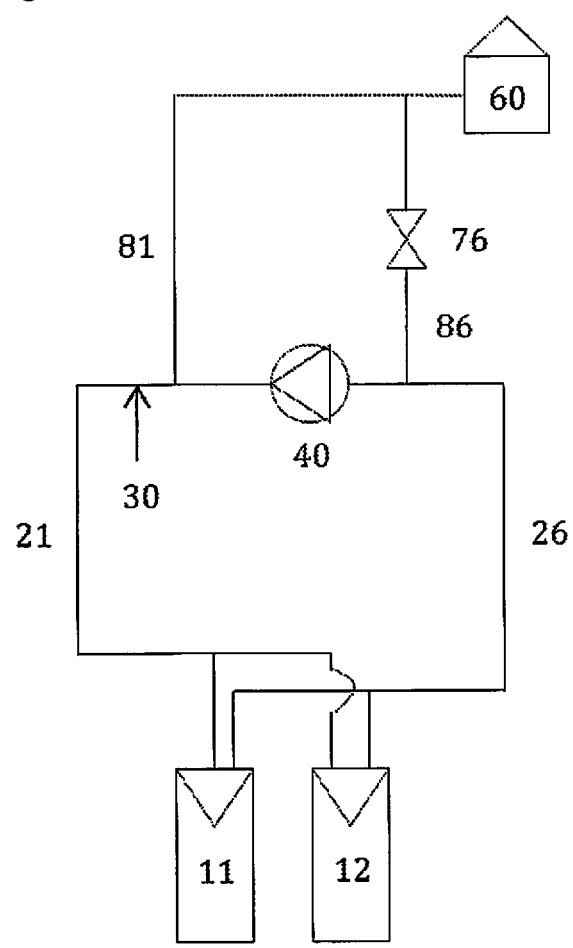
FIG. 11 illustrates an eleventh example of the present arrangement.

FIG. 11 illustrates an example of the present arrangement wherein the process gas is provided to the gas recirculation arrangement at the pressure side of the primary gas recirculation loop. In FIG. 11, like components are designated by the same reference numerals as used in any one or more of FIGS. 1 to 10.

With reference to FIG. 11 in an alternative example an arrangement for recirculation of flotation gas in a mineral flotation process wherein the primary gas recirculation loop comprises means 30 for providing process gas into the primary gas recirculation loop. As shown in FIG. 11, the means 30 for providing process gas into the primary gas recirculation loop is advantageously located for providing process gas into the primary gas recirculation loop after the gas pressurizer 40 and after the connection point of the flushing line 81.

Figure 12:
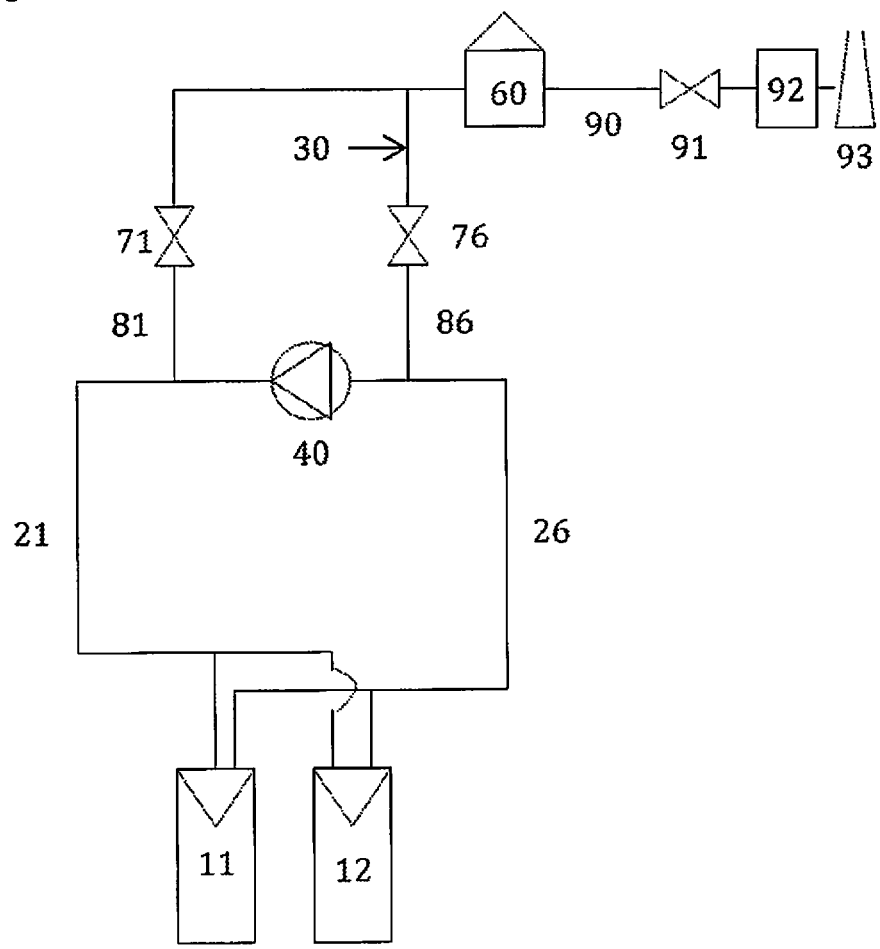
FIG. 12 illustrates a twelfth example of the present arrangement.

FIG. 12 shows a particularly preferred example of an arrangement for recirculation of flotation gas in a mineral flotation process, comprising
  a primary gas recirculation loop comprising
  in a pressure side of the primary gas recirculation loop a gas feed manifold 21 for providing recirculating flotation gas into one or more flotation cell unit(s) 11, 12,
  a gas pressurizer 40 for pressurising recirculating flotation gas flow at said gas feed manifold,
  in a suction side of the primary gas recirculation loop a gas suction manifold 26 for collecting flotation gas from the gas collection space(s) of a mineral flotation arrangement comprising of the flotation cell unit(s) 11,12 and transferring it to the gas pressurizer 40;
  a closed pressure equalization loop comprising
  an apparatus for storing gas and adsorbing changes of gas pressure 60, in particular a gas buffer tank,
  a flushing line 81 for connecting the pressure side of the primary gas recirculation loop to the apparatus for storing gas and adsorbing changes of gas pressure 60 for allowing expulsion of a fraction of the volume of the recirculating flotation gas from the primary gas recirculation loop, whereby the flushing line 81 comprises a second pressure reducing means 71 for reducing the pressure of flotation gas expulsed from the pressure side of the primary gas recirculation loop to the closed pressure equalization loop to or close to the level of the pressure of the closed pressure equalization loop, and
  a suction line 86 for connecting the suction side of the primary gas recirculation loop to the apparatus for storing gas and adsorbing changes of gas pressure 60, either directly or via the flushing line 81, for allowing flotation gas, present in the apparatus for storing gas and adsorbing changes of gas pressure 60 and/or in the flushing line 81, to be withdrawn into the suction side of the primary gas recirculation loop through the suction line 86, whereby the suction line 86 comprises a first pressure reducing means 76 for restricting flotation gas flow through the suction line 86 thereby maintaining and/or providing gauge vacuum to the suction side of the primary gas recirculation loop,
  means 30 for providing process gas into the closed pressure equalization loop at the suction line 86, and
  a primary bleeding line 90 connecting from the apparatus for storing gas and adsorbing changes of gas pressure 60 to the atmosphere for bleeding recirculating flotation gas from the closed pressure equalization loop to atmosphere, whereby the primary bleeding line 90 comprises a control valve 91 for controlling the bleed of the flotation gas from the closed pressure equalization loop and preventing uncontrolled back flow of the bled flotation gas back to the closed pressure equalization loop and a gas cleaning apparatus 92 for cleaning the bled gas before it is released to the atmosphere via a stack 93. In FIG. 12, like components are designated by the same reference numerals as used in any one or more of FIGS. 1 to 11.

Figure 13:
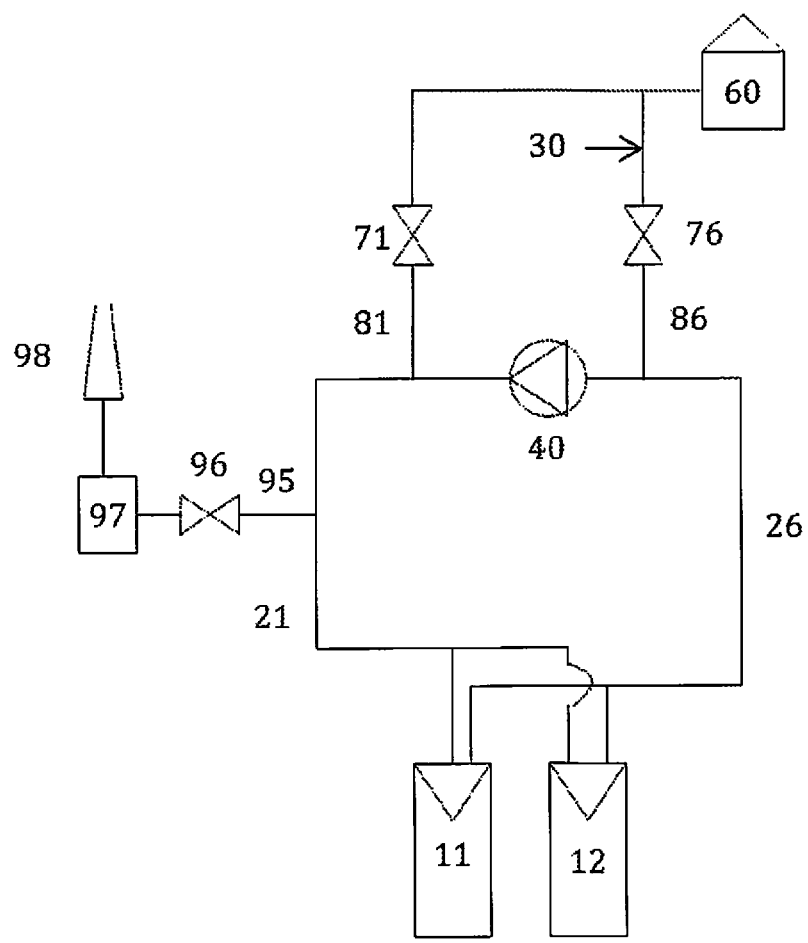
FIG. 13 illustrates a thirteenth example of the present arrangement.

FIG. 13 shows an alternatively preferred example of an arrangement for recirculation of flotation gas in a mineral flotation process, comprising
  a primary gas recirculation loop comprising
  in a pressure side of the primary gas recirculation loop a gas feed manifold 21 for providing recirculating flotation gas into one or more flotation cell unit(s) 11, 12,
  a gas pressurizer 40 for pressurising recirculating flotation gas flow at said gas feed manifold,
  in a suction side of the primary gas recirculation loop a gas suction manifold 26 for collecting flotation gas from the gas collection space(s) of a mineral flotation arrangement comprising the flotation cell unit(s) 11,12 and transferring it to the gas pressurizer 40, and
  a secondary bleeding line 95 connecting from the pressure side of the primary gas recirculation loop to the atmosphere for bleeding recirculating flotation gas from the primary gas recirculation loop to atmosphere, whereby the secondary bleeding line 95 comprises a control valve 96 for controlling the bleed of the flotation gas from the primary gas recirculation loop and a gas cleaning apparatus 97 for cleaning the bled gas before it is released to the atmosphere via a stack 98;
  a closed pressure equalization loop comprising
  an apparatus for storing gas and adsorbing changes of gas pressure 60, in particular a gas buffer tank,
  a flushing line 81 for connecting the pressure side of the primary gas recirculation loop to the apparatus for storing gas and adsorbing changes of gas pressure 60 for allowing expulsion of a fraction of the volume of the recirculating flotation gas from the primary gas recirculation loop, whereby the flushing line 81 comprises a second pressure reducing means 71 for reducing the pressure of flotation gas expulsed from the pressure side of the primary gas recirculation loop to the closed pressure equalization loop to or close to the level of the pressure of the closed pressure equalization loop, and
  a suction line 86 for connecting the suction side of the primary gas recirculation loop to the apparatus for storing gas and adsorbing changes of gas pressure 60, either directly or via the flushing line 81, for allowing flotation gas, present in the apparatus for storing gas and adsorbing changes of gas pressure 60 and/or in the flushing line 81, to be withdrawn into the suction side of the primary gas recirculation loop through the suction line 86, whereby the suction line 86 comprises a first pressure reducing means 76 for restricting flotation gas flow through the suction line thereby maintaining and/or providing gauge vacuum to the suction side of the primary gas recirculation loop, and means 30 for providing process gas into the closed pressure equalization loop at the suction line 86. In FIG. 13, like components are designated by the same reference numerals as used in any one or more of FIGS. 1 to 12.

It will be obvious to a person skilled in the art that, as the technology advances, the inventive concept can be implemented in various ways. The invention and its embodiments are not limited to the examples described above but may vary within the scope of the claims.

The invention claimed is:

1. An arrangement for recirculation of flotation gas in a mineral flotation process, comprising:
   a primary gas recirculation loop comprising:
      in a pressure side of the primary gas recirculation loop
         a gas feed manifold for providing recirculating flotation gas into a flotation cell unit,
         a gas pressurizer for pressurising recirculating flotation gas flow at said gas feed manifold,
      in a suction side of the primary gas recirculation loop
         a gas suction manifold for collecting flotation gas from a gas collection space(s) of a mineral flotation arrangement comprising the flotation cell unit, and transferring the collected flotation gas to the gas pressurizer; wherein the arrangement further comprises:
   a closed pressure equalization loop comprising:
      an apparatus for storing gas and adsorbing changes of gas pressure,
      a flushing line for connecting the pressure side of the primary gas recirculation loop to the apparatus for storing gas and adsorbing changes of gas pressure for allowing expulsion of a portion of the volume of the recirculating flotation gas from the primary gas recirculation loop, and
      a suction line for connecting the suction side of the primary gas recirculation loop to the apparatus for storing gas and adsorbing changes of gas pressure, either directly or via the flushing line, for allowing flotation gas, present in the apparatus for storing gas and adsorbing changes of gas pressure and/or in the flushing line, to be withdrawn into the suction side of the primary gas recirculation loop through the suction line,
      wherein the suction line comprises first pressure reducer for at least one of restricting flotation gas flow through the suction line thereby maintaining and providing gauge vacuum to the suction side of the primary gas recirculation loop.

2. The arrangement as claimed in claim 1, wherein each flotation cell unit is a sealed flotation cell unit.

3. The arrangement as claimed in claim 1, wherein the first pressure reducer further prevents uncontrolled back flow of the recirculating flotation gas from the suction side of the primary gas recirculation loop to the closed pressure equalization loop.

4. The arrangement as claimed in claim 1, wherein the first pressure reducer provides together with the apparatus for storing gas and adsorbing changes of gas pressure, a 0.5 to 15 mbar, gauge vacuum to the suction side of the primary recirculation loop.

5. The arrangement as claimed in claim 1, wherein the first pressure reducer is a water lock.

6. The arrangement as claimed in claim 1, wherein the first pressure reducer comprises a gas restrictor and an interlock.

7. The arrangement as claimed in claim 6, wherein the gas restrictor is selected from the group consisting of choke tubes, choke pipes, choke orifice plates, flow restricting membranes and flow restricting packed-bed units.

8. The arrangement as claimed in claim 6, wherein the interlock is selected from the group consisting of no-return valves, check valves, and backflow barriers.

9. The arrangement as claimed in claim 1, wherein the first pressure reducer is a control valve.

10. The arrangement as claimed in claim 1, wherein the flushing line comprises a second pressure reducer for reducing the pressure of flotation gas expulsed from the pressure side of the primary gas recirculation loop to the closed pressure equalization loop to or close to the level of the pressure of the closed pressure equalization loop.

11. The arrangement as claimed in claim 10, wherein the second pressure reducer is a control valve.

12. The arrangement as claimed in claim 1, wherein the gas collection space(s) of a mineral flotation arrangement comprising the flotation cell units comprises the headspace(s) of the flotation cell units.

13. The arrangement as claimed in claim 12, wherein the gas collection space(s) of a mineral flotation arrangement comprising the flotation cell units further comprises froth collection line(s) that share a common gas space with said flotation cell unit(s).

14. The arrangement as claimed in claim 12, wherein the gas collection space(s) of a mineral flotation arrangement comprising the flotation cell units further comprises the headspace of a concentrate sump wherein mineral concentrate provided by the mineral flotation process is collected.

15. The arrangement as claimed in claim 1, wherein the gas collection space(s) of a mineral flotation arrangement comprising the flotation cell units comprises the headspace(s) of the flotation cell units, froth collection line(s) that share a common gas space with said flotation cell unit(s) and the headspace of a concentrate sump wherein mineral concentrate provided by the mineral flotation process is collected via said froth collection line(s).

16. The arrangement as claimed in claim 1, wherein the arrangement further comprises a bleeding line for bleeding recirculating flotation gas from at least one of the primary gas recirculation loop and the secondary gas recirculation loop.

17. The arrangement as claimed in claim 16, wherein the closed pressure equalization loop comprises a primary bleeding line for bleeding recirculating flotation gas from the closed pressure equalization loop.

18. The arrangement as claimed in claim 17, wherein the primary bleeding line connects from the apparatus for storing gas and adsorbing changes of gas pressure to the atmosphere and comprises means for controlling the bleed of the flotation gas from the closed pressure equalization loop and preventing uncontrolled back flow of the bled flotation gas.

19. The arrangement as claimed in claim 18, wherein the primary bleeding line comprises a gas cleaning apparatus, for cleaning the bled flotation gas before it is released to the atmosphere.

20. The arrangement as claimed in claim 18, wherein the means for controlling the bleed of the flotation gas from the closed pressure equalization loop and preventing uncontrolled back flow of the bled flotation gas is a control valve.

21. The arrangement as claimed in claim 16, wherein the primary gas recirculation loop comprises a secondary bleeding line for bleeding recirculating flotation gas from the primary gas recirculation loop.

22. The arrangement as claimed in claim 21, wherein the secondary bleeding line is in the pressure side of the of the primary gas recirculation loop.

23. The arrangement as claimed in claim 21, wherein the secondary bleeding line comprises means for controlling the bleed of the flotation gas from the primary gas recirculation loop.

24. The arrangement as claimed in claim 23, which further comprises a gas cleaning apparatus for cleaning the bled flotation gas before it is released to the atmosphere.

25. The arrangement as claimed in claim 23, wherein the means for controlling the bleed of the flotation gas from the primary gas recirculation loop is a control valve.

26. The arrangement as claimed in claim 1, wherein the arrangement further comprises at least one of means for providing process gas into the primary gas recirculation loop and the closed pressure equalization loop.

27. The arrangement as claimed in claim 26, wherein the closed pressure equalization loop comprises means for providing process gas into the closed pressure equalization loop.

28. The arrangement as claimed in claim 1,
wherein the flushing line comprises a second pressure reducer for reducing the pressure of flotation gas expulsed from the pressure side of the primary gas recirculation loop to the closed pressure equalization loop to or close to the level of the pressure of the closed pressure equalization loop, and
wherein the suction line comprises a first pressure reducer for restricting flotation gas flow through the suction line thereby at least one of maintaining and providing gauge vacuum to the suction side of the primary gas recirculation loop,
and whereby the closed pressure equalization loop further comprises:
means for providing process gas into the closed pressure equalization loop at the suction line, and
a primary bleeding line connecting from the apparatus for storing gas and adsorbing changes of gas pressure to the atmosphere for bleeding recirculating flotation gas from the closed pressure equalization loop to atmosphere, whereby the primary bleeding line comprises a control valve for controlling the bleed of the flotation gas from the closed pressure equalization loop and preventing uncontrolled back flow of the bled flotation gas back to the closed pressure equalization loop and a gas cleaning apparatus for cleaning the bled gas before it is released to the atmosphere via a stack.

29. The arrangement as claimed in claim 1, wherein the primary gas recirculation loop further comprises:
a secondary bleeding line connecting from the pressure side of the primary gas recirculation loop to the atmosphere for bleeding recirculating flotation gas from the primary gas recirculation loop to atmosphere, whereby the secondary bleeding line comprises a control valve 96 for controlling the bleed of the flotation gas from the primary gas recirculation loop and preventing uncontrolled back flow of the bled flotation gas back to the closed pressure equalization loop and a gas cleaning apparatus for cleaning the bled gas before it is released to the atmosphere via a stack; and
wherein the flushing line comprises a second pressure reducer for reducing the pressure of flotation gas expulsed from the pressure side of the primary gas recirculation loop to the closed pressure equalization loop to or close to the level of the pressure of the closed pressure equalization loop, and
wherein the suction line comprises a first pressure reducer for restricting flotation gas flow through the suction line thereby at least one of maintaining and providing gauge vacuum to the suction side of the primary gas recirculation loop, and
wherein the closed pressure equalization loop further comprises means for providing process gas into the closed pressure equalization loop at the suction line.

30. The arrangement as claimed in claim 1, wherein the apparatus for storing gas and adsorbing changes of gas pressure is a gas buffer tank.

31. A method for recycling flotation gas in a mineral flotation process, comprising:
supplying flotation gas from a primary gas recirculation loop to one or more flotation cell units;
collecting flotation gas from the gas collection space(s) of a mineral flotation arrangement comprising the flotation cell unit(s) and recirculating the collected flotation gas back to the flotation cell unit(s) via the primary gas recirculation loop comprising a gas pressurizer; the method comprising:
allowing a portion of the volume of the recirculating flotation gas to be bled from pressure side of the primary gas recirculation loop via a flushing line to a closed pressure equalization loop comprising an apparatus for storing gas and adsorbing changes of gas pressure, in particular a gas buffer tank;
maintaining the pressure of the closed pressure equalization loop at a predetermined gauge pressure level by utilizing the apparatus for storing gas and adsorbing changes of gas pressure;
allowing flotation gas to be withdrawn from the closed pressure equalization loop into the suction side of the primary gas recirculation loop via a suction line comprising pressure reducing means for restricting gas flow through the suction line and preventing back flow of the flotation gas from the suction side of the primary gas recirculation loop, thereby providing gauge vacuum to the suction side of the primary gas recirculation loop and the flotation cell unit(s); and
optionally providing at least one of process gas into the primary gas recirculation loop and to the closed pressure equalization loop.

* * * * *